April 14, 1959     N. O. MOVICK     2,881,873

CONSTANT LOADING DEVICE

Filed March 29, 1957

INVENTOR:
Nyle O. Movick

His Patent Attorney

United States Patent Office 2,881,873
Patented Apr. 14, 1959

2,881,873

CONSTANT LOADING DEVICE

Nyle O. Movick, Fullerton, Calif., assignor to Northrop Aircraft, Inc., Hawthorne, Calif., a corporation of California Application March 29, 1957, Serial No. 649,549

3 Claims. (Cl. 188—134)

This invention relates to constant loading apparatus and more particularly to a constant load device adapted under normal conditions to maintain a constant or fixed load on the output member of a prime mover or the like.

The constant load device as disclosed herein has utility in various and varied installations. For example, it may be used to advantage as an intermediate mechanism between the output member of a servo system and apparatus to be driven by the system. A servo system, and especially a closed loop servo system, may and quite frequently does when subjected to varying conditions function in an erratic and undesirable manner. The foregoing is especially true unless, as the system operates throughout a predetermined operating range, the output member of the system is continuously subjected to a constant torque load. Therefore, the subject device may be operationally mounted between the output member of the aforementioned servo system and the input member of the driven device and functions to maintain a constant load on the output member of the servo system and this in turn ensures the efficient operation of the system.

Accordingly it is an object of the present invention to provide a device adapted to be installed between the output member of a prime mover or the like and the input member of apparatus to be driven thereby and which functions to maintain a constant torque load on the output member although varying loads, occurring within a predetermined range, may act on the latter member.

Another object is to provide a constant load device which is simple in design yet rugged in construction, which is economical to manufacture, and which may be easily adapted to a plurality of installations.

Figure 1:
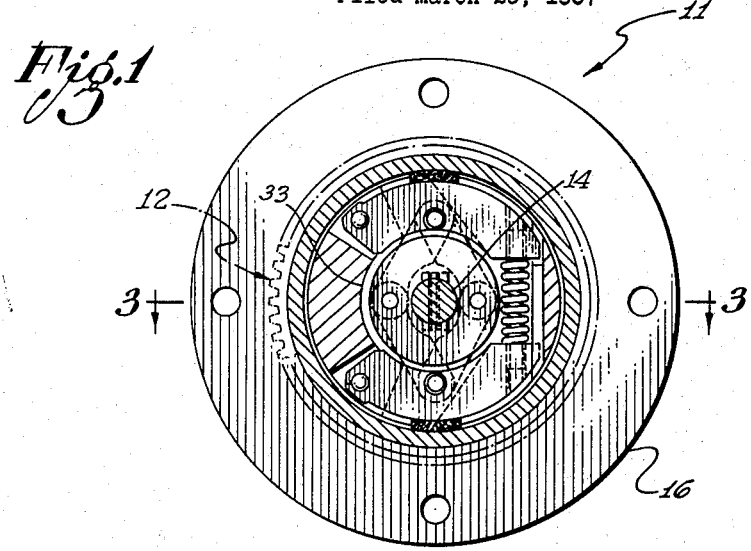
Figure 2:
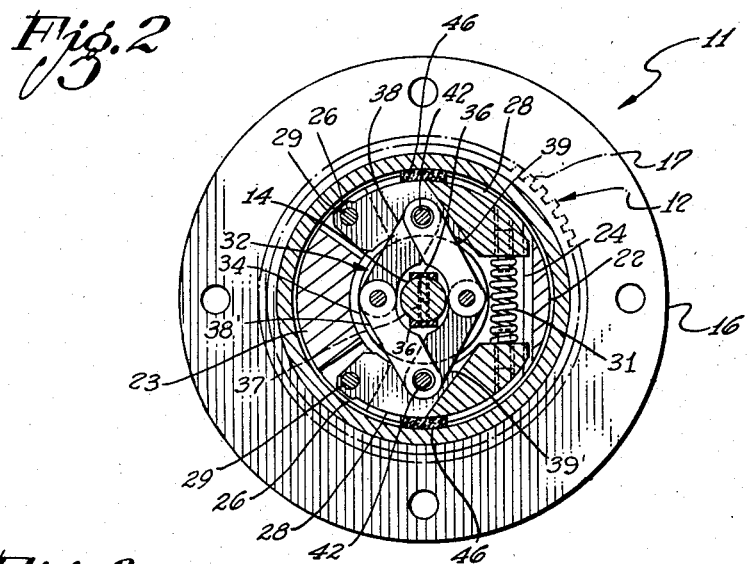
Figure 3:
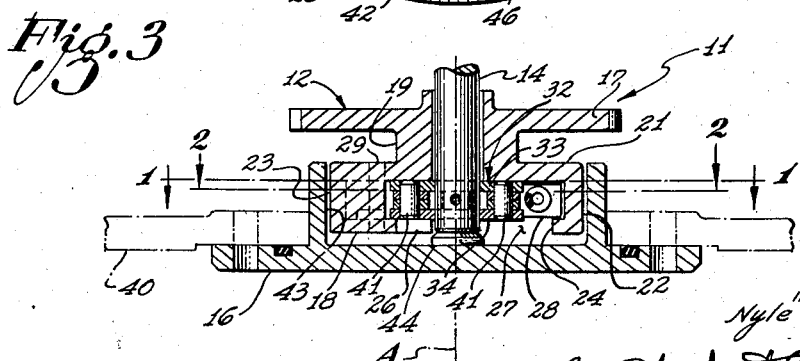

Although the characteristic features of the present invention are particularly pointed out in the appended claims, the invention itself, also the manner in which it may be carried out, will be better understood by referring to the following description taken in connection with the accompanying drawings forming a part of this application and in which:

Figures 1 and 2 are cross-sectional views of the constant load device as disclosed herein and as viewed along the lines 1—1 and 2—2, respectively, of Figure 3.

Figure 3 is a cross-sectional view of the constant load device as viewed along the lines 3—3 of Figure 1.

Referring to the drawing, a constant load device 11 of the type disclosed herein is shown in the various figures and includes a driving member 12, a driven member 14, and a drum member 16. Although the members 12 and 14 are referred to in the present discussion as driving and driven members, respectively, it is to be understood that their functions may be reversed, that is the member 12 may function as the driven member and member 14 as the driving member.

In the embodiment shown the driving member 12 consists of a spur gear 17 and a housing portion 18, integrally connected by a hub portion 19 having a central bore, while the driven member 14 constitutes a shaft of conventional construction. The driving and driven members 12 and 14 are concentrically mounted for rotary movement about a common axis A. In this respect it will be noted that the diameter of the central bore of the hub portion 19 exceeds the diameter of the shaft 14 thus permitting relative movement between the shaft 14 and hub 19.

The housing portion 18 of the member 12 includes an upper wall 21 and side walls 22 and 23, the latter walls being located diametrically opposite each other with respect to the axis A. The arcuate side wall surfaces of the walls 22 and 23 constitute portions of a common cylindrical surface of predetermined diameter. Intermediate portions of the side walls 22 and 23 are cut away to provide ledges or inwardly extending shoulders 24 and 26, respectively. The side walls terminate short of each other, as best seen in Figures 1 and 2, and cooperate with the upper wall 21 and shoulders 24 and 26 to define a partially closed cavity 27 adapted to receive a pair of brake shoes 28—28. The shoes 28 are positioned in the cavity 27 with end portions thereof resting on the shoulders 24 and 26 as best seen in Figure 3. The relationship of the housing portion 18 and shoes 28 is further characterized in that the arcuate surfaces of the latter is substantially located in the aforementioned common cylindrical surface partially defined by the arcuate surfaces of the side walls 22 and 23.

The ends of the shoes resting on the shoulders 26 are secured in position for pivotal movement on pins 29 the ends of which are positioned in bores formed in the upper wall 21 and shoulders 26 of the portion 18. A compression spring 31 is mounted between the ends of the shoes resting on the shoulder 24 and is held in position by means of pins or the like.

A brake sheave 32, consisting of upper and lower disks 33 and 34, respectively, are integrally secured together by connecting members 36. The brake sheave is pinned to an end of the shaft 14 by a pin 37 which passes through the shaft and the connecting members 36. It will therefore be apparent that the shaft 14 and sheave 32 moves as a unit.

The sheave 32 and portion 18 of the driving member 12 are secured together by two pairs of links 38—38' and 39—39'. Respective inner ends of the links 38, 38', 39 and 39' are positioned between the disks 33 and 34 of the sheave 32 in juxtaposed relation and respective outer ends thereof are positioned in juxtaposed relation between bifurcated ends of the shoes 28.

The inner ends of the pair of links 38—38' and the pair of links 39—39' are pivotally attached to the sheave 32 at respective common points by a pair of pins 41—41 which extend between the disks 33 and 34 at diametrically opposite positions with respect to the axis A. The outer ends of the links 38 and 38' and 39 and 39' are pivotally attached to respective shoes 28 by means of a pair of pins 42 which extend between bifurcated ends of the shoes and at diametrically opposite positions with respect to the axis A substantially as shown in Figures 1 and 2. In this respect it will be noted that the apertures in the outer ends of all the connecting links are somewhat larger in diameter than the pins 42. This relationship allows two opposite links, for example the links 38 and 39', to pivot slightly inboard as the shoes 28 are urged inboard under the influence of the links 39 and 38' as will be better understood at such time as the operation of the device 11 is described.

Surrounding the housing portion 18 of the driving member 12 and brake shoes 28 is the aforementioned drum member 16. The drum member is fixedly secured to non-movable structure 40 and defines an internal cylindrical surface 43. The driving member 12 may be supported and its relative position maintained with respect to the drum member 16 by means of a thrust bearing 44 and other bearings (not shown) which provide support for the shaft 14 and in turn the driving member 12. As mounted the cylindrical surface 43 of the member 16, the outer arcuate surfaces of the side walls 22 and 23, and the outer arcuate surfaces of the brake shoes 28 have a concentric relationship. Also mounted on the outer arcuate surfaces of each of the brake shoes is a short length of brake lining 46 having a known coefficient of friction.

The operating characteristics of the constant load device 11 will be clarified by the following description of its operation. In this discussion it will also be assumed that the device 11 is connected between a prime mover (not shown), applying its output to the spur gear 17 to rotate the driving member 12 in a clockwise direction, and that the shaft 14 is connected to apparatus (not shown) to be driven thereby and which subjects the shaft 14 to varying torque loads occurring within a predetermined range. Further it is to be understood that the coefficient of friction of the lining blocks 46 with respect to the surface 43 is known and the spring rate of the spring 31 is also predetermined.

With no torque load acting on the shaft 14 the spring 31 will exert its full force on the shoes 28. Full force of the spring 31 acting on the shoes 28 and in turn the lining blocks 46, and in the absence of any counter force, the linings will exert maximum pressure and friction on the cylindrical surface 43 thereby causing the input member of the prime mover to see a maximum torque load hereinafter referred to as the maximum input torque $T_1$. Under the above conditions the input torque load $T_1$ results entirely from the load due to the friction of the blocks 46 on the surface 43 and is hereinafter referred to as the brake torque $T_2$.

If a torque load, hereinafter referred to as the load torque $T_3$, is subsequently applied to the shaft 14 the latter will tend to lag behind the driving member 12. The links 38 and 39' will immediately be placed in tension and will exert a force on the pins 42 exceeding that exerted by the links 39 and 38'. The links 39 and 38' will pivot about the pins 41—41 and will not exert any material force on the pins 42—42 and accordingly will have no effect on the movement of the shoes 28. The links 39 and 38' together with the shoes 28 will tend to be pivoted inboard under the influence of the links 38 and 39'. This action, due to the design of and known properties of the blocks 46 and spring 31, will reduce the brake torque $T_2$ by the same amount as the increase in the load torque $T_3$ applied to the shaft 14.

In view of the above explanation it will be seen that the device 11 will function throughout its operating range in accordance with the following equation:

$$T_1 = T_2 + T_3$$

in which:

$T_1$ = input torque (applied to the spur gear 17).
$T_2$ = brake torque (torque occurring due to friction between the linings 46 and surface 43).
$T_3$ = load torque (torque acting on the output shaft 14).

It is immaterial whether the spur gear 17 is driven in a clockwise or counter-clockwise direction or whether the shaft 14 is the driven or the driving member the operation of the device represented by the above equation $T_1 = T_2 + T_3$ will remain true. Accordingly it is seen that a constant load device is provided which will enable the output member of a prime mover or the like to see a constant torque load throughout the operating range of the device.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A constant load device adapted to operate throughout a predetermined torque range comprising: a housing having a cylindrical chamber formed therein and including means whereby said housing may be fixedly secured to non-movable structure; driven and driving members which are generally circular in cross-section and mounted in concentric relation; linkage means and brake means attached to and interconnecting said members to maintain them in said concentric relation and function to transmit rotary movement therebetween; said brake means including spring means and a pair of brake shoes; means mounting said members for rotary movement in said cylindrical chamber with the braking surface of said brake shoes normally urged into contact with the wall defining said cylindrical chamber by said spring means; and said link means and brake means cooperating with said driven and driving members to maintain a constant torque load on said driving member as the torque load acting on said driven member varies throughout said predetermined torque range.

2. A constant load device adapted to operate throughout a predetermined torque range comprising: a housing having a cylindrical chamber formed therein and including means whereby said housing may be fixedly secured to non-movable structure; driven and driving members mounted in concentric relation for rotary movement about a common axis and in which the outermost one of said members is partially cylindrical in cross-section; linkage means and brake means attached to and interconnecting said members to maintain them in said concentric relation and function to transmit rotary movement therebetween; said brake means including spring means and a pair of brake shoes, the shoes being mounted on said driving and driven members at diametrically opposed positions with respect to said common axis; means mounting said members for rotary movement in said cylindrical chamber with the braking surface of said brake shoes normally urged into contact with the inner surface of the wall defining said cylindrical chamber by said spring means; and said link means and brake means cooperating with said driven and driving members to maintain a constant torque load on said driving member as the torque load acting on said driven member varies throughout said predetermined torque range.

3. A constant load device as set forth in claim 2: further characterized in that said linkage means includes two pairs of links: one end of the links of each pair being pivotally attached at respective common points on one of said members at diametrical opposite positions with respect to said common axis and the other ends of said links being pivotally and slideably connected to the other one of said members.

References Cited in the file of this patent

UNITED STATES PATENTS

| | | |
|---|---|---|
| 1,609,439 | Strong | Dec. 7, 1926 |
| 2,199,081 | Perin | Apr. 30, 1940 |
| 2,322,303 | Martin | June 22, 1943 |